United States Patent

Masuda et al.

[11] Patent Number: 5,545,046
[45] Date of Patent: Aug. 13, 1996

[54] CHARGING CONNECTOR FOR ELECTRIC VEHICLE

[75] Inventors: Satoki Masuda; Toshiaki Hasegawa, both of Shizuoka, Japan

[73] Assignees: Yazaki Corporation, Tokyo; Toyota Jidosha Kabushiki Kaisha, Aichi, both of Japan

[21] Appl. No.: 364,488

[22] Filed: Dec. 27, 1994

[30] Foreign Application Priority Data

Dec. 27, 1993 [JP] Japan .................................. 5-347136

[51] Int. Cl.$^6$ .................................................. H01R 13/44
[52] U.S. Cl. .......................... 439/142; 439/144; 439/222; 439/956
[58] Field of Search ........................ 439/142, 144, 439/218, 222, 221, 956

[56] References Cited

U.S. PATENT DOCUMENTS

| | | |
|---|---|---|
| 4,784,610 | 11/1988 | Stuart ...................................... 439/144 |
| 4,936,788 | 6/1990 | Lin ............................................ 439/218 |
| 5,049,086 | 9/1991 | Slaven ...................................... 439/144 |
| 5,299,099 | 3/1994 | Archambault ............................ 439/144 |
| 5,302,141 | 4/1994 | O'Reilly et al. ......................... 439/144 |
| 5,382,171 | 1/1995 | Hofmann et al. ........................ 439/142 |
| 5,478,250 | 12/1995 | Hoffman ................................... 439/142 |

FOREIGN PATENT DOCUMENTS

| | | | |
|---|---|---|---|
| 60-24539 | 6/1985 | Japan ........................... | H01R 13/639 |
| 4124774 | 11/1992 | Japan .............................. | H01R 13/52 |

*Primary Examiner*—M. Rachuba
*Assistant Examiner*—Adesh Bhargava
*Attorney, Agent, or Firm*—Sughrue, Mion, Zinn, Macpeak & Seas

[57] ABSTRACT

A DC power receiving portion and a DC power receiving portion, which are separated from each other, are provided within a power receiving connector of a unitary structure, and a first cap is provided for closing an entire open end of the power receiving connector, and a second cap is provided on the first cap for closing a through hole which can be brought into registry with the AC power receiving portion.

3 Claims, 6 Drawing Sheets

5,545,046

CHARGING CONNECTOR FOR ELECTRIC VEHICLE

BACKGROUND OF THE INVENTION

1. Field of the Invention

This invention relates to a charging connector for an electric vehicle, and more particularly to a connector construction in which two power receiving portions (that is, an alternating current receiving portion and a direct current receiving portion) are combined into a single structure.

2. Related Art

An electric vehicle can travel by driving a DC motor through a charged, self-contained power source (charging battery) mounted on the vehicle. The self-contained power source is charged by a power feed apparatus usually installed at a charging station as in the refueling of a gasoline vehicle. The charging will now be described with reference to FIG. 7 in connection with Japanese Patent Examined Publication No. 60-24539. A feeder connector 103A, connected to a feeder cord 102 extending from a power feed apparatus 101, is connected to a power receiving connector 103B of a vehicle 104, so that an electric power is supplied to a self-contained battery 106 electrically connected to the power receiving connector 103B.

One example of a charging connector is disclosed in Japanese Utility Model Unexamined Publication No. 4-124774. The connector disclosed in this publication will now be described with reference to FIG. 8. The charging connector includes a receptacle 50 for mounting on a vehicle body, and a plug 70 for connection to a power source. The receptacle 50 includes a cylindrical tubular body 51 with a closed bottom, a plurality of male connection terminals 52 provided in a projected manner within the tubular body 51, and a closure lid 53 for openably closing an open end 51a of the tubular body 51. A flange 54 for mounting on the vehicle body is formed integrally at the open end 51a of the tubular body 51 of the receptacle 50.

The plug 70 includes a fitting shaft portion 71 for being removably fitted in the tubular body 51, and an abutment step portion 73 for abutment against the open end 51a upon fitting of the fitting shaft portion 71, the fitting shaft portion 71 having connection holes 72 for receiving the male connection terminals 52, respectively.

With this construction, in view of the condition of use, the charging connector for the electric vehicle has a sufficient strength to withstand repeated connecting and disconnecting operations, and also has an excellent waterproof ability.

Problems with an electric vehicle are that a travel distance achieved by one charging operation (travel distance for one charging operation) is not entirely satisfactory, and that the number of charging stations is small. Therefore, the conventional electric vehicle is usually equipped with a power receiving portion for quick charging (DC 150–400 A) at a charging station and a power receiving portion for low-speed charging by a commercial power source (for example, AC 240 V) at home.

An electric vehicle, having such dual circuit charging means, will now be described with reference to FIG. 9. A self-contained battery 110 mounted on the vehicle has a power receiving connector (power receiving portion) 112A for a charging station which connector is connected to the battery via a joint box 111, and a power receiving connector (power receiving portion) 114A for a commercial power source which connector is connected to the battery via the joint box 111 and a charger 113 mounted on the vehicle. The battery can be charged through a feeder connector 112B of a charger 115 at the charging station (DC power source) and also through a feeder connector 114B at home (AC power source).

With this construction, the electric vehicle can be charged selectively by the commercial power source at home and at the charging station, and therefore the problem is overcome.

In the above construction, however, since the power receiving portions for charging the self-contained battery must be provided respectively at two locations in the vehicle, there has been a problem from the viewpoint of the installation space. Particularly, because of the features of the above connectors, such as a waterproof design, their size is increased, so that the installation space is increased, and therefore the above problem is not negligible.

Furthermore, as a result of an erroneous connection of the charging connector, the direct current and the alternating current may be fed erroneously.

SUMMARY OF THE INVENTION

The present invention has been made in view of the above problems, and an object of the invention is to provide a charging connector for an electric vehicle in which a power receiving portion is formed as a single structure, and part of terminals are for common use if necessary, so that both AC and DC charging functions can be obtained with a single power receiving connector, wherein an installation space in the vehicle is reduced with this single connector construction, and an erroneous connection of the connector can be eliminated.

The above object has been achieved by a charging connector of the present invention for an electric vehicle wherein a DC feeder connector and an AC feeder connector are selectively connected, so that a self-contained battery is charged through a power receiving connector, wherein the power receiving connector includes a DC power receiving portion and an AD power receiving portion which are separated from each other in a recess in the power receiving connector; a first cap is provided for openably closing an entire open end of the recess; and a second cap is pivotally mounted on an outer surface of the first cap for openably closing a through hole formed through that portion of the first cap disposed in registry with the AC power receiving portion, the AC feeder connector being adapted to pass through the through hole.

The electric vehicle-charging connector includes retaining pawls for respectively retaining the first and second caps in their closed condition, and the retaining pawl for the first cap is provided adjacent to the open end of the recess, and the retaining pawl for the second cap is provided on the first cap.

Part of signal terminals in the DC power receiving portion used for charging when the first cap is opened also serve as signal terminals for the AC power receiving portion.

The power receiving connector is provided with the DC power receiving portion and the AC power receiving portion, and therefore both DC and AC charging functions can be achieved. Moreover, the DC power receiving portion and the AC power receiving portion are combined into the single unit, and further part of the signal terminals are for common use if necessary, thereby reducing the size of the charging connector, so that the installation space in the vehicle can be saved.

Furthermore, there are provided the caps for respectively closing the DC power receiving portion and the AC power receiving portion, and therefore by opening and closing the required cap in accordance with the charging mode, an erroneous connection of the DC feeder connector and the AC feeder connection can be prevented.

DETAILED DESCRIPTION OF THE PREFERRED EMBODIMENTS

DETAILED DESCRIPTION OF THE PREFERRED EMBODIMENTS

Figure 1:
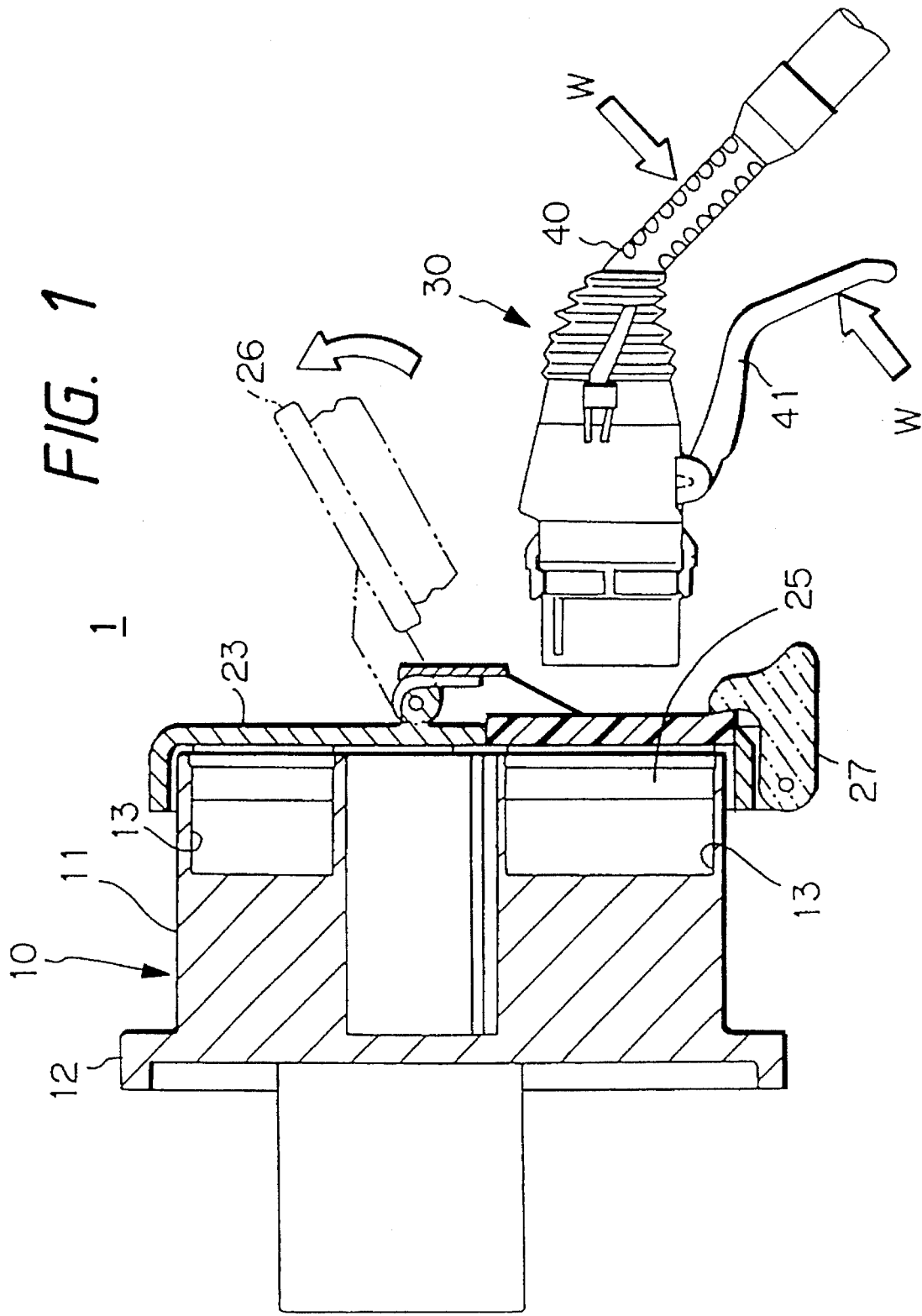
FIG. 1 is a partly cross-sectional, side-elevational view of one preferred embodiment of an electric vehicle-charging connector of the present invention.
Figure 2:
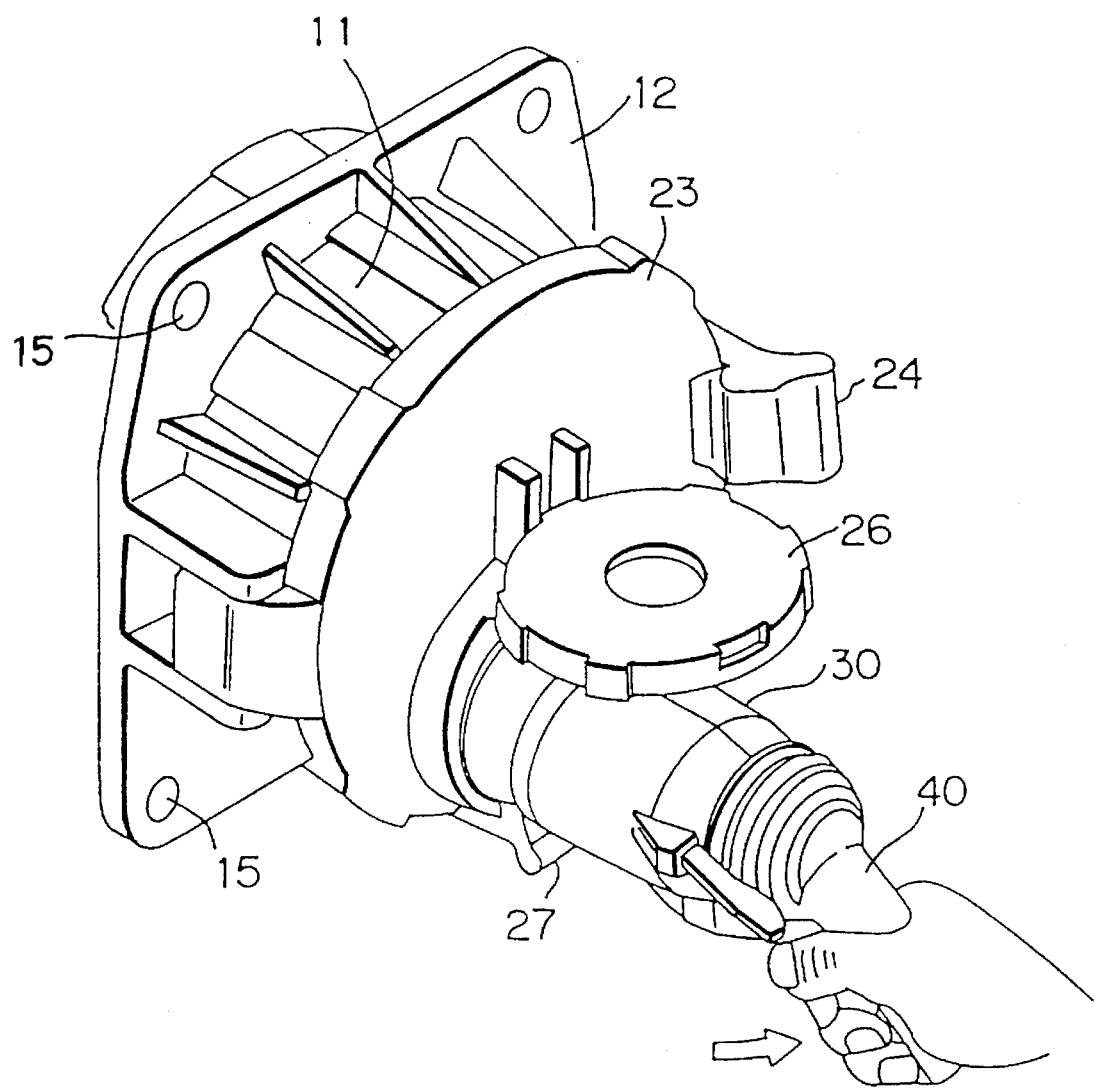
FIG. 2 is a perspective view of the charging connector of FIG. 1 in a fitted condition.
Figure 3:
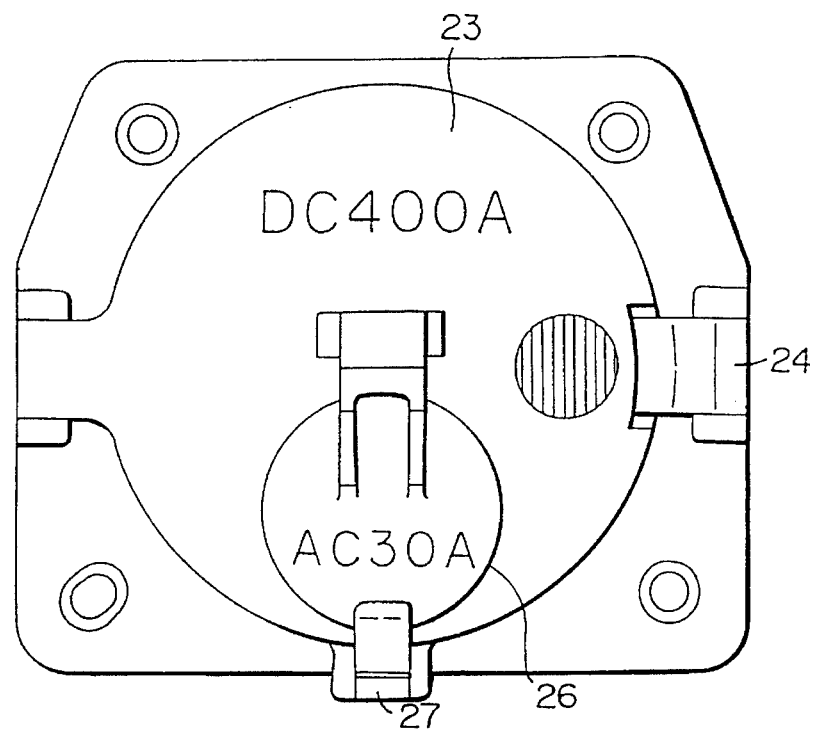
FIG. 3 is a front-elevational view of a power receiving connector shown in FIG. 1.
Figure 4:
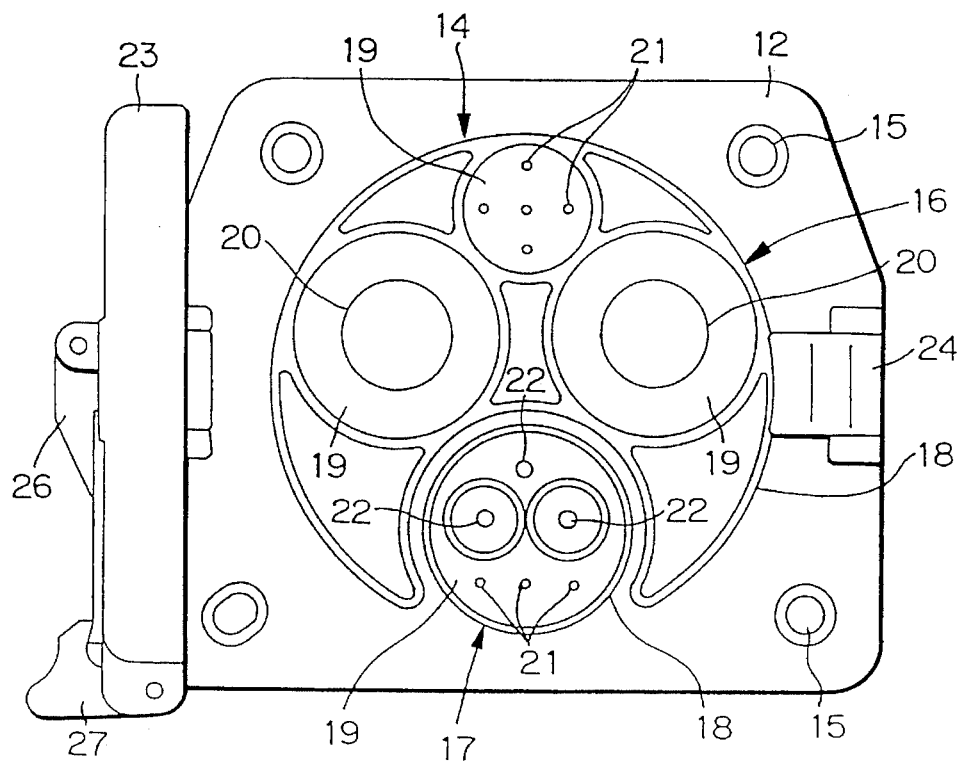
FIG. 4 is a front-elevational view showing the power receiving connector of FIG. 3 with a first cap held in an open condition.

A preferred embodiment of a charging connector of the present invention for an electric vehicle will now be described in detail with reference to FIGS. 1 to 4. FIG. 1 is a partly cross-sectional, side-elevational view of the electric vehicle-charging connector of the present invention, FIG. 2 is a perspective view of the charging connector of FIG. 1 in a fitted condition, FIG. 3 is a front-elevational view of a power receiving connector shown in FIG. 1, and FIG. 4 is a front-elevational view showing the power receiving connector of FIG. 3 with a first cap held in an open condition.

The charging connector 1 includes a power receiving connector 10 for being fixedly mounted on a vehicle body, and a feeder connector 30 adapted to be fitted in the power receiving connector 10 to charge a self-contained battery (not shown) mounted on the vehicle.

The power receiving connector 10 is of a cylindrical tubular construction with a closed bottom, and includes an outer casing 11 of aluminum having a flange 12 formed integrally on an outer surface thereof for mounting on the vehicle body, and a housing portion 14 (see FIG. 4) of a generally cylindrical shape fitted in a recess 13 formed in the outer casing 11. A plurality of bolt holes 15 for mounting the connector to the vehicle body are formed through the flange 12.

In the above description, although the outer casing 11 and the housing portion 14 are separate from each other, they can be provided as an integrally molded structure.

The housing portion 14 is molded of an insulative resin, and as shown in a plan view of FIG. 4, this housing portion 14 includes a DC (direct current) power receiving portion 16 of a larger diameter, and an AC (alternating current) power receiving portion 17 inscribed in the DC power receiving portion 16. These power receiving portions 16 and 17 are separated from each other by outer walls 18 of a generally circular shape fitted on protective walls 35 (later described). A waterproof packing (not shown) is fitted on a proximal portion of the outer wall 18, and prevents water from intruding into the inside when the feeder connector 30 is fitted. A waterproof packing is also provided on a cap for covering the housing portion 14, and serves to provide a waterproof function when the feeder connector 30 is not connected. Various male terminals 20 to 22 are provided in a projected manner within spaces enclosed by the outer walls 18, and those regions except for these male terminals serve as fitting recesses 19 for receiving the protective walls 35.

A first cap 23 for openably closing an entire open end of the housing portion 14 in the recess 13 is pivotally mounted on the outer casing 11. A first retaining lever 24 for engaging the first cap 23 to hold the same in a closed condition is pivotally mounted on the outer casing 11, and is disposed adjacent to an open end of the recess 13.

The first cap 23 has a through hole 25 (see FIG. 1) which is brought into registry with the AC power receiving portion 17 when this first cap is closed, and the first cap 23 has a second cap 26 pivotally mounted on an outer surface thereof for closing the through hole 25. The first cap 23 has a second retaining lever 27 mounted on the outer peripheral surface thereof for retaining the second cap 26 in its closed position.

In this embodiment, the first cap 23 is opened and closed in a lateral direction whereas the second cap 26 is opened and closed in a vertical direction. However, the direction of opening and closing of each cap can be changed in accordance with the mounting of the connector on the vehicle.

The DC power receiving portion 16 includes male terminals 20 of DC 400 A for a two-pole power source, and male signal terminals 21 of 8 poles. The AC power receiving portion 17 includes male terminals 22 (including an earth terminal) of AC 30A for a three-pole power source, and male signal terminals 21 of 3 poles. Namely, part of the male signal terminals 21 are for common use.

Figure 5:
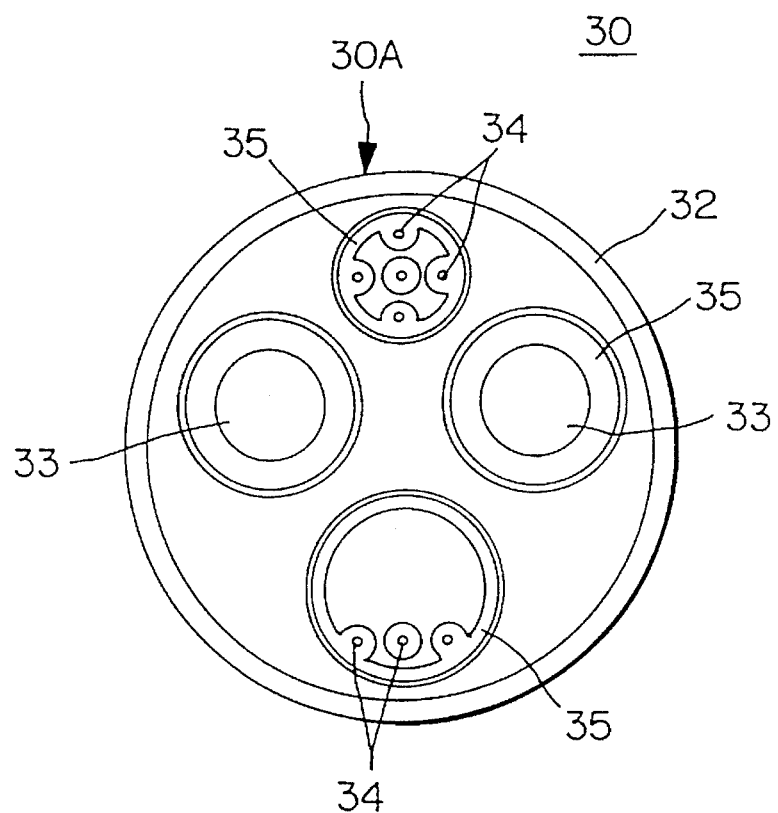
FIG. 5 is a view showing a terminal arrangement of a DC feeder connector for fitting in the power receiving connector of FIG. 4.
Figure 6:
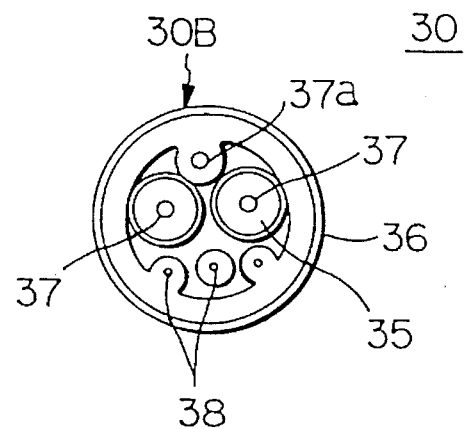
FIG. 6 is a view showing a terminal arrangement of a AC feeder connector for fitting the power receiving connector of FIG. 4.
Figure 7:
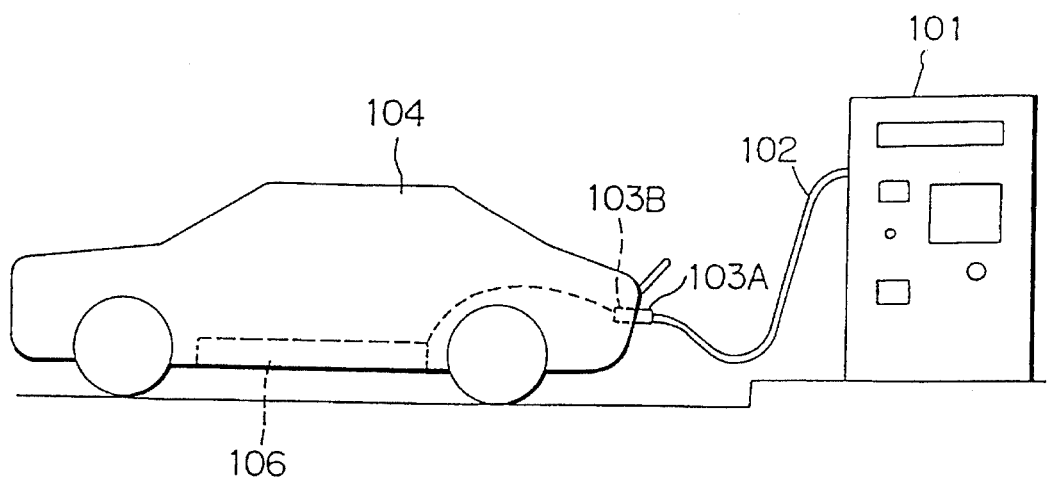
FIG. 7 is a schematic view showing a conventional charging operation.
Figure 8:
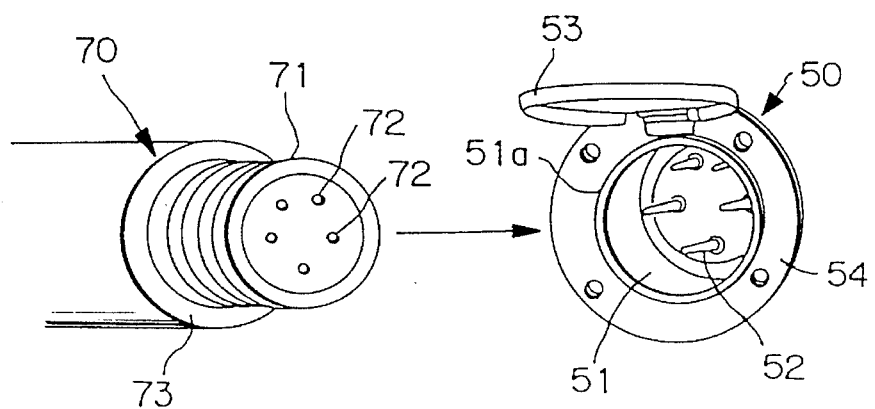
FIG. 8 is a perspective view showing a conventional connector construction.
Figure 9:
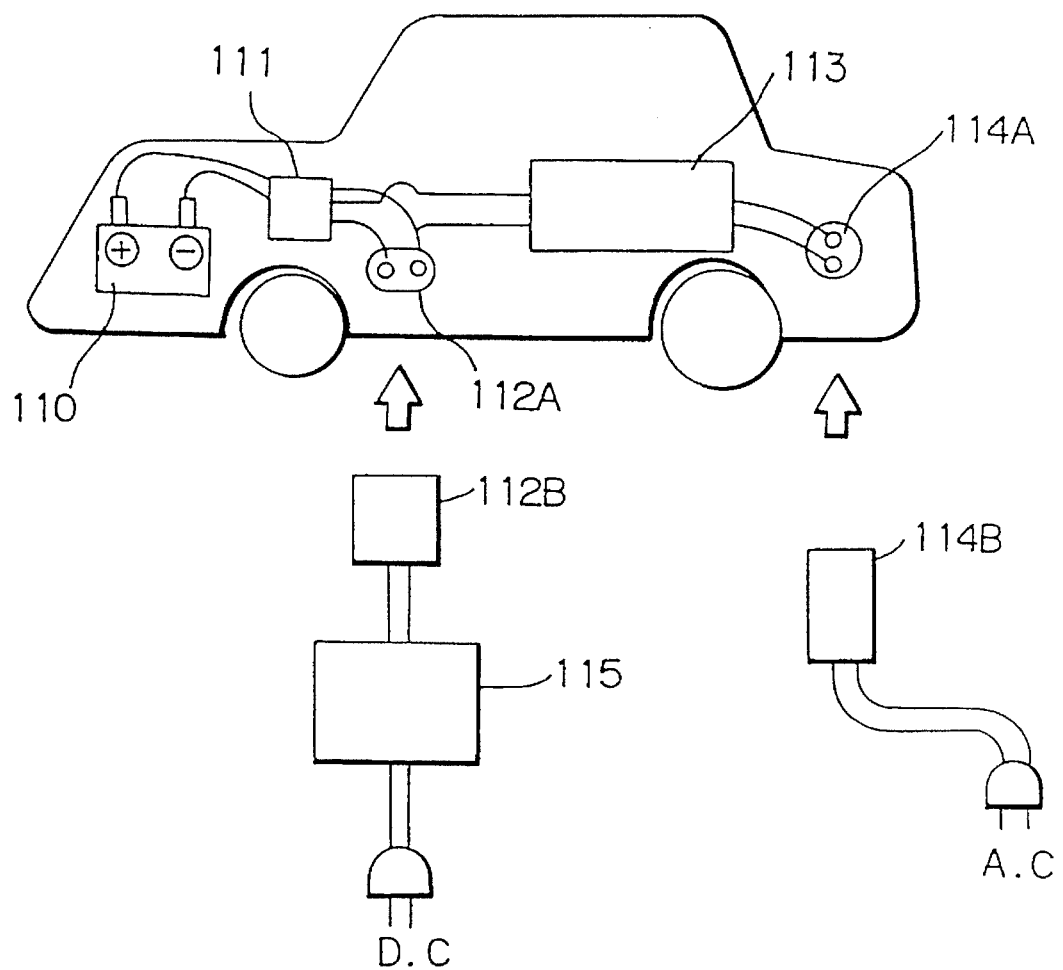
FIG. 9 is a schematic view showing another conventional charging operation.

There are provided separate feeder connectors 30, and one includes a DC connector 30A with a terminal arrangement shown in FIG. 5, and the other includes an AC connector 30B with a terminal arrangement shown in FIG. 6. The DC connector 30A can be fitted in the DC power receiving portion 16 of the power receiving connector 10, and the AC connector 30B can be fitted in the AC power receiving portion 17 of the power receiving connector 10.

Referring to the DC connector 30A with reference to FIG. 5 showing a plan configuration thereof, this connector 30A has a peripheral wall 32 for fitting on the DC power receiving portion 16 of the power receiving connector 10, and within the peripheral wall 32, the protective walls 35 (which are adapted to be fitted in the respective recesses 19) each surrounding female terminals 33, 34 are provided in a projected manner. The female terminals 33 are power terminals, and the female terminals 34 are signal terminals. The terminals 34 may be the same as terminals 38.

The AC connector 30B, shown in FIG. 6 showing its plan configuration, has a peripheral wall 36 for fitting on the AC power receiving portion 17 of the power receiving connector 10, and within the peripheral wall 36, the protective wall 35

(which is adapted to be fitted in the recess 19) surrounding female terminals 37 and 38 is provided in a projected manner. The female terminals 37 are power terminals (Reference numeral 37a denotes an earth terminal), and the female terminals 38 are signal terminals.

Each feeder connector 30 with the above terminal arrangement has a grip portion 40 integrally formed thereon as shown in FIGS. 1 and 2, and by grasping this grip portion in a manner to urge a lock lever 41 toward the connector body as indicated by a thick arrow W, the feeder connector 10 can be fitted in and removed from the power receiving connector 10. In this embodiment, only the AC feeder connector 30 is shown in FIGS. 1 and 2.

When the charging connector 1 of the above construction is to be quickly charged at a charging station, the first retaining lever 24 is manipulated to open the first cap 23 as shown in FIG. 4, and then the DC connector 30A is fitted in the power receiving connector 10, thereby effecting the charging. On the other hand, when the low-speed charging is to be effected at home, the second retaining lever 27 is manipulated to open the second cap 26, with the first cap 23 kept closed, and the AC connector 30B is fitted in the AC power receiving portion 17 of the power receiving connector 10 through the exposed through hole 25, thereby effecting the charging.

In such a sequential charging operation, the corresponding cap is opened and closed in accordance with the selected charging mode, and therefore an erroneous connection of the feeder connector can be easily recognized, thereby avoiding such an erroneous connection.

ADVANTAGEOUS EFFECTS OF THE INVENTION

As described above, in the charging connector of the present invention for an electric vehicle, the plurality of power receiving portions, used in accordance with the respective charging modes, are provided as the single structure, and therefore the installation space in the vehicle body can be saved. Moreover, the AC and DC charging functions can be achieved with the single power receiving connector. Furthermore, the signal terminals for the AC and DC are in common use, and therefore the connector can be further reduced in size, thereby greatly saving the installation space.

What is claimed is:

1. A power receiving connector comprising:

a DC power receiving portion and an AC power receiving portion arranged in a recess portion of the power receiving connector, the DC power receiving portion and the AC power receiving portion separated from each other;

a first cap provided for openably closing an entire open end of the recess; and a second cap pivotally, mounted on an outer surface of the first cap, for openably closing a through hole formed through a portion of the first cap corresponding to the AC power receiving portion.

2. A power receiving connector as claimed in claim 1, further comprising:

a first pivotal retaining pawl for retaining the first cap in a closed condition the first pivotal retaining pawl being provided adjacent to the open end of the recess; and a second pivotal retaining pawl for retaining the second cap in a closed condition, the second pivotal retaining pawl being provided on the first cap.

3. A power receiving connector as claimed in claim 1, wherein part of signal terminals in the DC power receiving portion used for charging when the first cap is opened serve to part of signal terminals for the AC power receiving portion.

\* \* \* \* \*